(12) United States Patent
Neisinger et al.

(10) Patent No.: US 9,380,169 B2
(45) Date of Patent: Jun. 28, 2016

(54) QUALITY OF SERVICE (QOS)-ENABLED VOICE-OVER-INTERNET PROTOCOL (VOIP) AND VIDEO TELEPHONY APPLICATIONS IN OPEN NETWORKS

(75) Inventors: Chris Neisinger, Danville, CA (US); Lindsay Paul Notwell, Columbus, OH (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 827 days.

(21) Appl. No.: 12/816,503

(22) Filed: Jun. 16, 2010

(65) Prior Publication Data

US 2011/0310885 A1 Dec. 22, 2011

(51) Int. Cl.
*H04L 12/24* (2006.01)
*H04M 15/00* (2006.01)
*H04L 12/851* (2013.01)
*H04L 29/06* (2006.01)

(52) U.S. Cl.
CPC ............ *H04M 15/56* (2013.01); *H04L 41/5029* (2013.01); *H04M 15/00* (2013.01); *H04M 15/8016* (2013.01); *H04L 47/2408* (2013.01); *H04L 65/80* (2013.01)

(58) Field of Classification Search
CPC ........... H04L 41/5029; H04L 47/2408; H04M 15/00; H04M 15/8016
USPC ......................................................... 370/352
See application file for complete search history.

(56) References Cited

U.S. PATENT DOCUMENTS

| | | | |
|---|---|---|---|
| 7,929,567 B1 * | 4/2011 | Alasti et al. ................... | 370/468 |
| 7,940,756 B1 * | 5/2011 | Duffy et al. ................... | 370/389 |
| 2002/0075805 A1 * | 6/2002 | Gupta et al. .................. | 370/235 |
| 2003/0227871 A1 * | 12/2003 | Hsu et al. ...................... | 370/230 |
| 2004/0107284 A1 * | 6/2004 | Koperda et al. ............... | 709/229 |
| 2005/0198682 A1 * | 9/2005 | Wright ............................ | 725/96 |
| 2006/0221829 A1 * | 10/2006 | Holmstrom et al. .......... | 370/230 |
| 2007/0115817 A1 * | 5/2007 | Gupta et al. ................... | 370/230 |
| 2009/0175239 A1 * | 7/2009 | Grinshpun et al. ........... | 370/331 |
| 2009/0327493 A1 * | 12/2009 | Gauthier et al. .............. | 709/226 |

* cited by examiner

*Primary Examiner* — Khaled Kassim

(57) ABSTRACT

A device defines a first bucket for general Internet protocol (IP) traffic provided to and from a user device associated with an open network, and defines a second bucket for quality of service (QoS)-based traffic provided to and from the user device. The device also assigns a first billing rate for the general IP traffic associated with the first bucket, and assigns a second billing rate to the QoS-based traffic associated with the second bucket, where the second billing rate is greater than the first billing rate. The device further associates the first billing rate and the second billing rate with a subscriber associated with the user device.

18 Claims, 10 Drawing Sheets

FIG. 7

| Subscriber (710) | Traffic Type (720) | Billing Information (730) | Constraints (740) |
|---|---|---|---|
| Joe | VoIP QoS | Per MByte | 5GB / 1000 min. |
|  | General IP | Flat rate | None |
| Tom | Video Telephony QoS | $3 per minute | 300 kbps / 40 ms samples |
|  | VoIP QoS | $1 per minute | 100 kbps / 40 ms |
|  | General IP | Flat rate | None |
| *** | *** | *** | *** |

{ 750 }

700

QUALITY OF SERVICE (QOS)-ENABLED VOICE-OVER-INTERNET PROTOCOL (VOIP) AND VIDEO TELEPHONY APPLICATIONS IN OPEN NETWORKS

BACKGROUND

Voice-over-Internet Protocol (VoIP) is a technology that allows a user to make voice calls using a broadband Internet connection instead of a regular (e.g., analog) phone line. VoIP involves sending voice information in digital form in discrete packets rather than by using traditional circuit-committed protocols of the Public Switched Telephone Network (PSTN).

Video telephony includes technologies for the reception and transmission of audio and video signals by users at different locations, for communication between the users in real-time. Video telephony may be provided via several mechanisms, such as videophones, video conferencing, telepresence systems, and personal computer-based web cameras. Videophones and video-enabled mobile phones are usually used on a person-to-person basis. Video conferencing systems typically use digital Integrated Services Digital Network (ISDN) and IP transmission modes due to the need to convey very large amounts of data generated by cameras and microphones. Telepresence systems are a more advanced subset of video conferencing systems that allow greater degrees of video and audio fidelity. Personal computer-based web cameras are a modest form of video telephony typically used for point-to-point calls.

Quality of service (QoS) refers to resource reservation control mechanisms that provide different priorities to different applications, users, and/or traffic (e.g., data flows), or guarantees a certain level of performance to traffic. For example, a required bit rate, delay, jitter, packet dropping probability, and/or bit error rate (BER) may be guaranteed. QoS guarantees may be important if network capacity is insufficient, especially for real-time streaming multimedia applications (e.g., VoIP, online games, IP television (IP-TV), etc.), since these applications often require fixed bit rate and are delay sensitive.

The traditional method for deploying QoS to enable VoIP, video telephony, and other low-latency, bandwidth-limited applications is to negotiate QoS parameters for call set up and then police data flows in a network (e.g., a telecommunication network). Policing of the data flows is required because without policing there will be no value in the QoS. If every user (e.g., associated with a network) requests QoS for every application (e.g., used by the users), then the end result is that every user receives best effort treatment. In such a scenario, high bandwidth applications (e.g., web surfing, video downloads, etc.) are served just as effectively for the users whether or not the applications are provided via QoS over the network. In a "walled garden" or partly open network environment, the policing of the data flows can be implemented by checking ports being used and source and destination IP addresses against a pre-approved list. Such policing may be referred to as three-tuple and five-tuple QoS policing methods. With the advent of net neutrality rules and very open networks, the three-tuple and five-tuple QoS policing methods are ineffective. Thus, in open networks, more intrusive policing methods (e.g., deep packet inspection) are needed to ensure that only latency-sensitive applications are provided latency-advantaged QoS. However, such intrusive policing methods are time consuming and expensive to implement.

BRIEF DESCRIPTION OF THE DRAWINGS

FIG. 7 is a diagram of a portion of an example database capable of being provided in and/or managed by the management device of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide QoS-enabled VoIP and video telephony applications in open networks, without a need for QoS policing. In one implementation, for example, the systems and/or methods may define a first bucket (or identifier) for general IP traffic (e.g., associated with an open network) provided to/from one or more user devices, and may define a second bucket (or identifier) for QoS-based traffic (e.g., associated with the open network) provided to/from the one or more user devices. The systems and/or methods may assign a metered or flat billing rate to subscribers for the general IP traffic associated with the first bucket, and may assign a billing rate, which is greater than the metered/flat billing rate, to subscribers for the QoS-based traffic associated with the second bucket. The systems and/or methods may apply a flow rate limit to the QoS-based traffic associated with the second bucket.

As used herein, the terms "user" and "customer" are intended to be broadly interpreted to include a user device or a user of a user device. "Traffic," as used herein, is intended to be broadly construed to include a frame, a datagram, or a packet; a fragment of a frame, a fragment of a datagram, or a fragment of a packet; or another type, arrangement, or packaging of data.

Figure 1:
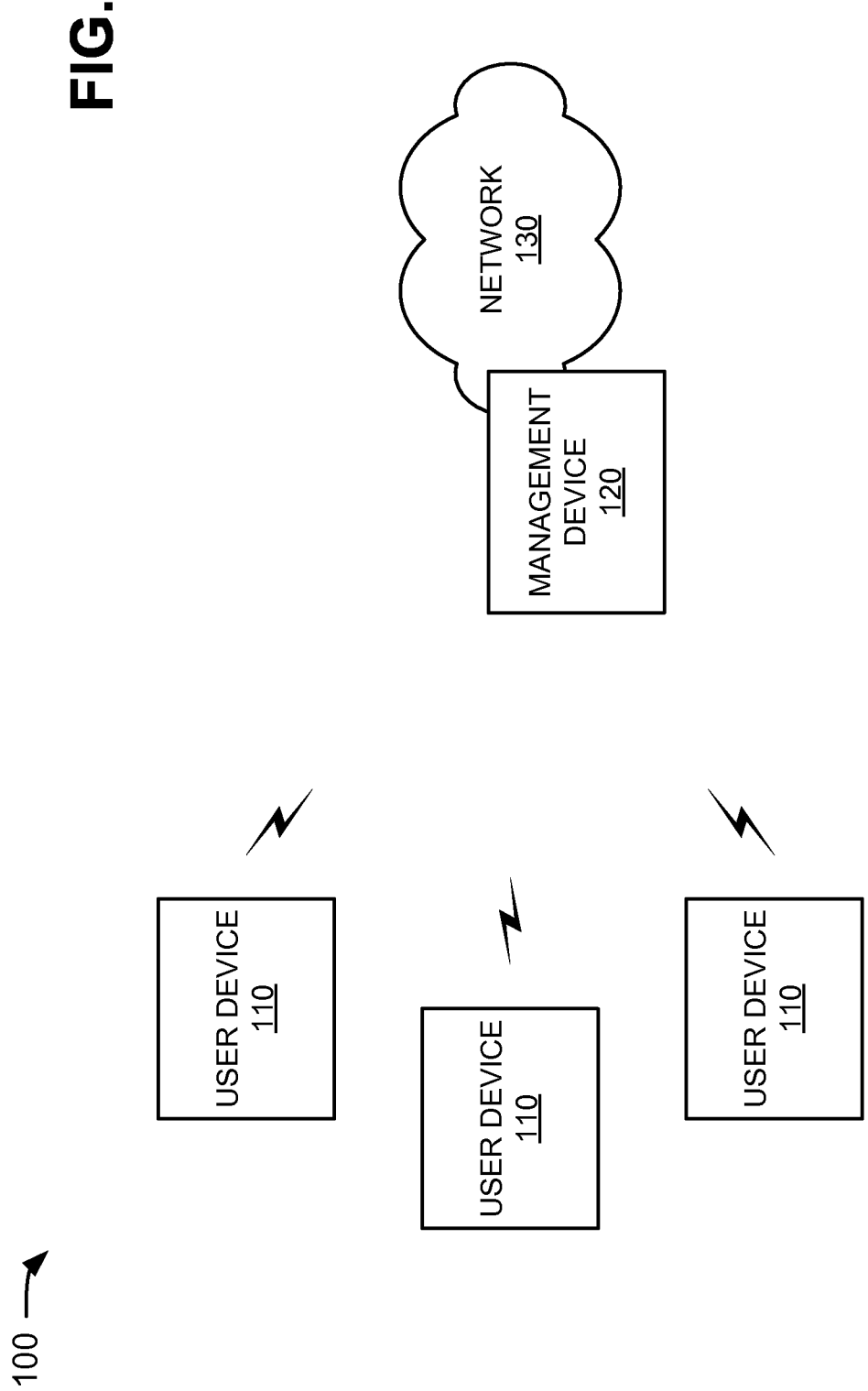
FIG. 1 is a diagram of an example network in which systems and/or methods described herein may be implemented.

FIG. 1 is a diagram of an example network 100 in which systems and/or methods described herein may be implemented. As illustrated, network 100 may include user devices 110, a management device 120, and a network 130. Components of network 100 may interconnect via wired and/or wireless connections. Three user devices 110, a single management device 120, and a single network 130 have been illustrated in FIG. 1 for simplicity. In practice, there may be more user devices 110, management devices 120, and/or networks 130. Also, in some instances, one or more of the components of network 100 may perform one or more functions described as being performed by another one or more of the components of network 100.

Each of user devices 110 may include any device that is capable of accessing network 130 via management device 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, a laptop computer, a personal computer, or other types of computation or communication devices.

Management device 120 may include one or more data transfer devices (or network devices), such as a gateway, a router, a switch, a firewall, a network interface card (NIC), a hub, a bridge, a proxy server, an optical add-drop multiplexer (OADM), or some other type of device that processes, manages, and/or transfers traffic. In one example, management device 120 may include one or more edge devices (e.g., edge routers) that provide entry points into enterprise, carrier, and/or service provider networks (e.g., network 130).

In one example implementation, management device 120 may define a first bucket for general IP traffic (e.g., associated with an open network, such as network 130) provided to/from one or more user devices 110, and may define a second bucket for QoS-based traffic (e.g., associated with the open network) provided to/from the one or more user devices 110. Management device 120 may assign a metered or flat billing rate to subscribers (e.g., associated with user devices 110) for the general IP traffic associated with the first bucket, and may assign a billing rate, which is greater than the flat billing rate, to subscribers for the QoS-based traffic associated with the second bucket. Management device 120 may also apply a flow rate limit to the QoS-based traffic associated with the second bucket.

Network 130 may include a local area network (LAN), a wide area network (WAN), a metropolitan area network (MAN), a telephone network, such as the PSTN, a cellular network, a Wi-Fi network, an intranet, the Internet, an optical fiber (or fiber optic)-based network, an enterprise network, a carrier network, a service provider network, or a combination of networks. In one example implementation, network 130 may include an open network. An open network may include a network of applications, devices, and/or systems that follows industry protocols and thereby creates an environment of total interoperability. This means that any new protocol-based products (e.g., for the open network) may automatically be compatible with other compliant products, applications, devices, and/or systems, with no additional programming or interfaces needed.

Although FIG. 1 shows example components of network 100, in other implementations, network 100 may contain fewer components, different components, differently arranged components, or additional components than depicted in FIG. 1.

Figure 2:
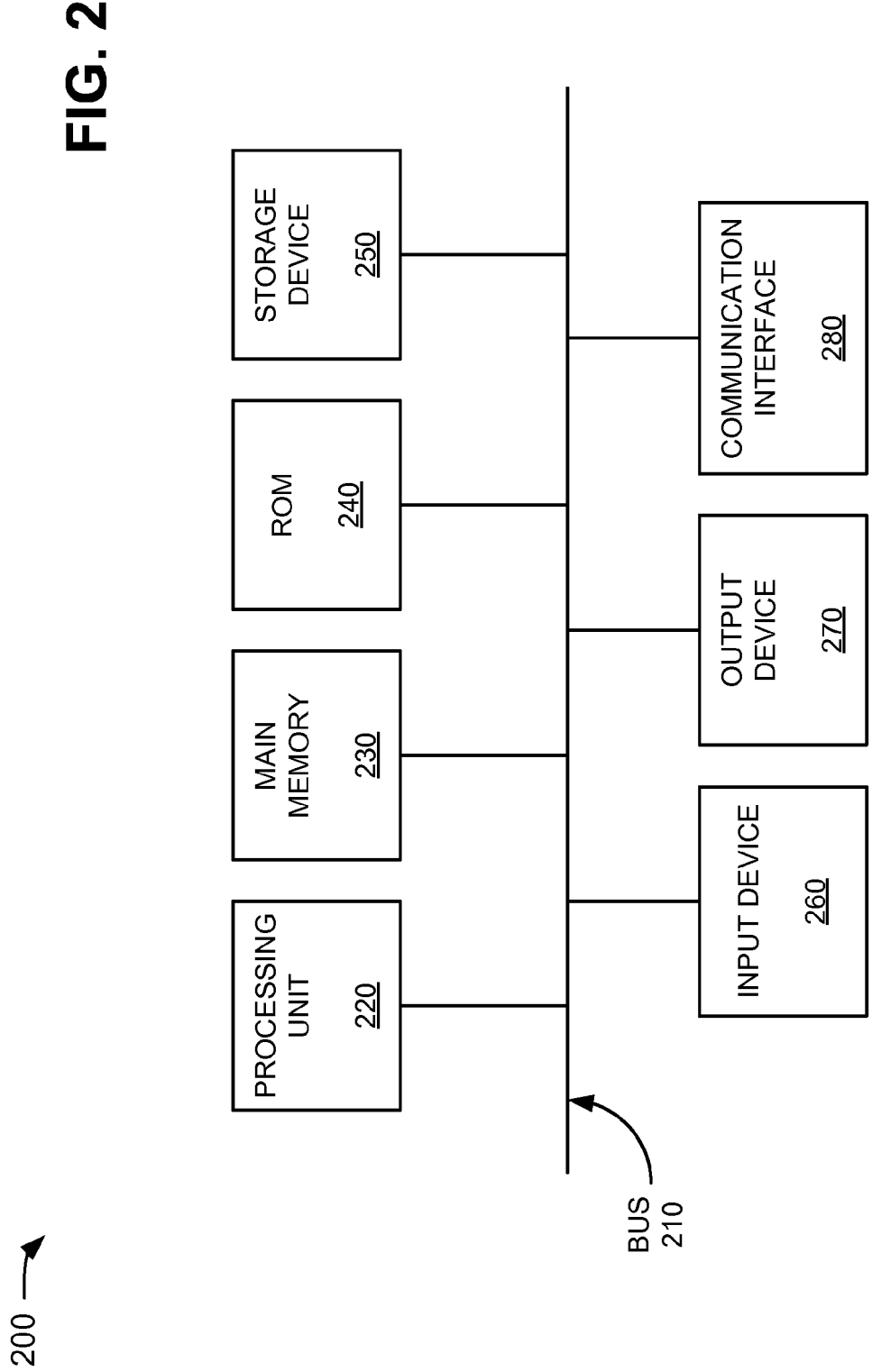
FIG. 2 is a diagram of example components of one of the devices depicted in FIG. 1.

FIG. 2 illustrates a diagram of example components of a device 200 that may correspond to one of the devices of network 100 (FIG. 1). As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
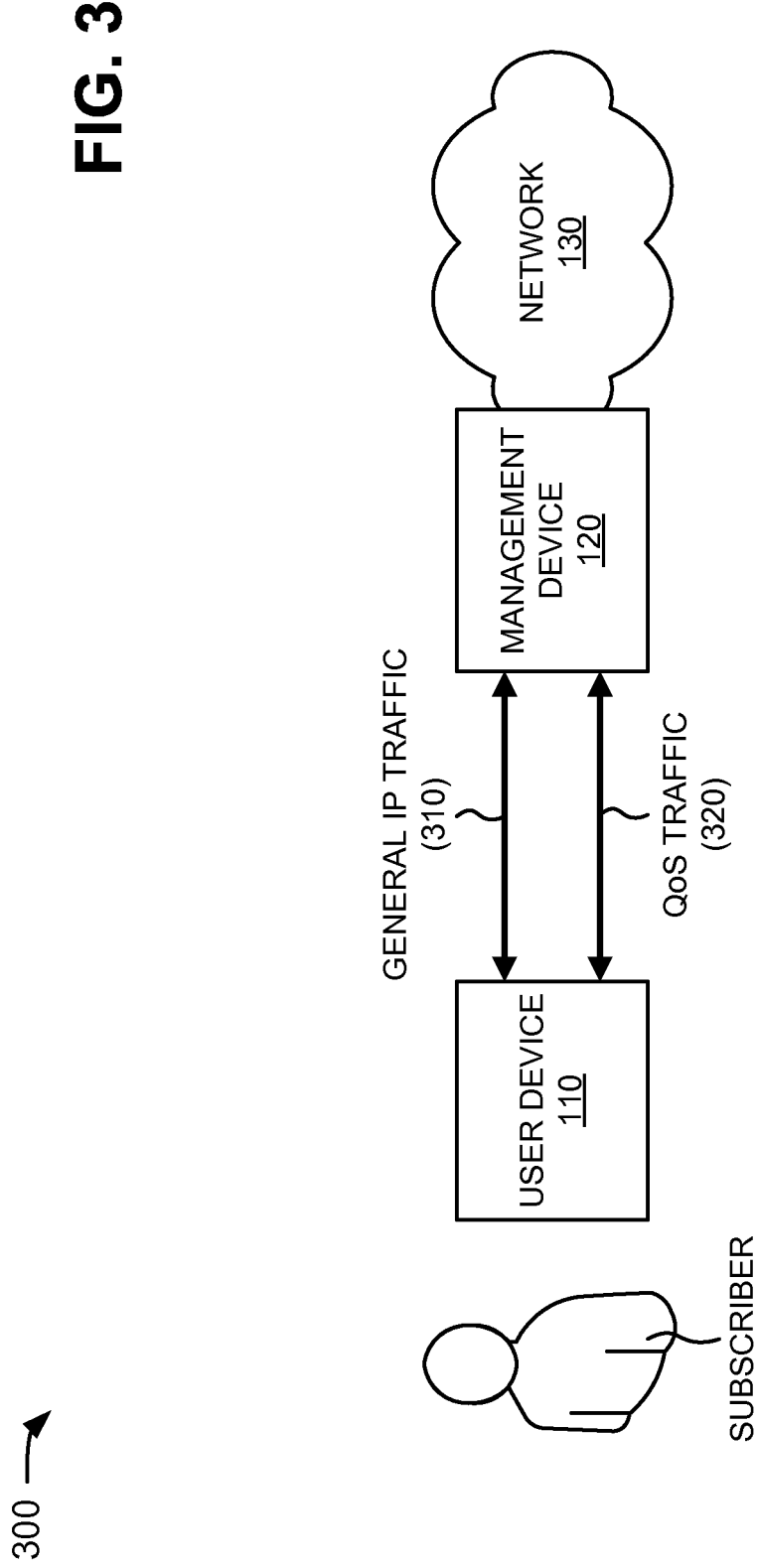
FIG. 3 is a diagram of example operations capable of being performed by an example portion of the network depicted in FIG. 1.

FIG. 3 is a diagram of example operations capable of being performed by an example portion 300 of network 100. As shown, network portion 300 may include user device 110, management device 120, and network 130. User device 110, management device 120, and network 130 may include the features described above in connection with FIGS. 1 and/or 2.

As further shown in FIG. 3, a subscriber (e.g., associated with user device 110) may transmit and/or receive (e.g., via user device 110) general IP traffic 310 to and/or from network 130 (e.g., via management device 120). General IP traffic 310 may include best effort traffic, non-detrimental traffic, traffic that is not sensitive to QoS metrics (e.g., jitter, packet loss, latency, etc.), etc. In one example, general IP traffic 310 may include peer-to-peer traffic and/or email applications-based traffic. The subscriber (e.g., associated with user device 110) may transmit and/or receive (e.g., via user device 110) QoS traffic 320 to and/or from network 130 (e.g., via management device 120). QoS traffic 320 may include traffic that is sensitive to QoS metrics (e.g., jitter, packet loss, latency, etc.), traffic that the subscriber expects to be delivered on time, etc. In one example, QoS traffic 320 may include VoIP traffic, online gaming traffic, video telephony traffic, and/or web browsing traffic.

Management device 120 may define a first bucket for general IP traffic 310 provided to/from user device 110, and may define a second bucket for QoS-based traffic 320 provided to/from user device 110. Management device 120 may assign a metered or flat billing rate to the subscriber for general IP traffic 310 associated with the first bucket, and may assign a billing rate, which is greater than the metered/flat billing rate, to the subscriber for QoS-based traffic 320 associated with the second bucket. Management device 120 may also apply a flow rate limit to QoS-based traffic 320 associated with the second bucket.

Although FIG. 3 shows example components of network portion 300, in other implementations, network portion 300 may contain fewer components, different components, differently arranged components, or additional components than depicted in FIG. 3. Alternatively, or additionally, one or more components of network portion 300 may perform one or more other tasks described as being performed by one or more other components of network portion 300.

Figure 4:
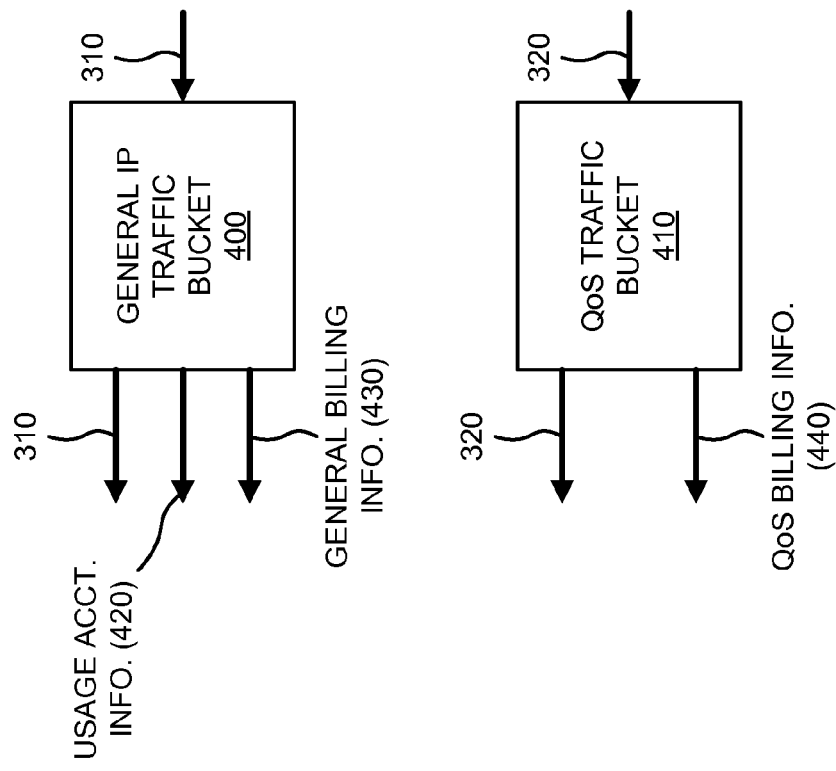
FIG. 4 is a diagram of example functional components of a management device of the network depicted in FIG. 1.

FIG. 4 is a diagram of example functional components of management device 120. In one example, the functional components described in connection with FIG. 4 may be implemented by one or more of the components depicted in FIG. 2. As shown, management device 120 may include a general IP traffic bucket 400 (e.g., a first bucket) and a QoS traffic bucket 410 (e.g., a second bucket). In one example implementation, general IP traffic bucket 400 may be administered independently of QoS traffic bucket 410. Management device 120 may initially determine whether traffic provisioned between user devices 110 and network 130 is general IP traffic 310 or QoS-based traffic 320. Management device 120 may route the traffic determined to be general IP traffic 310 to general IP traffic bucket 400, and may route the traffic determined to be QoS-based traffic 320 to QoS traffic bucket 410.

General IP traffic bucket 400 may include hardware or a combination of hardware and software that may receive general IP traffic 310 from user devices 110 and/or network 130, and may transmit general IP traffic 310 to user devices 110 and/or network 130. General IP traffic bucket 400 may apply a usage accounting plan to general IP traffic 310 (e.g., general IP traffic 310 may be subjected to a particular rate plan, such as a five gigabyte data plan), and may provide usage accounting information 420 to user device 110. Alternatively, or additionally, general IP traffic bucket 400 may store usage accounting information 420. Usage accounting information 420 may include measurement results for resource usage accounting (e.g., a number of transferred packets, bytes per flow, bandwidth usage, application usage, etc.).

General IP traffic bucket 400 may use usage accounting information 420 to generate general billing information 430, and may provide general billing information 430 to user device 110. Alternatively, or additionally, general IP traffic bucket 400 may store general billing information 430. General billing information 430 may include a billing rate to be charged (e.g., to a subscriber associated with user device 110) for provision of general IP traffic 310. For example, general billing information 430 may include metered billing (e.g., usage-based billing), flat rate billing (e.g., a single monthly fee), unlimited billing, etc. for provision of general IP traffic 310.

QoS traffic bucket 410 may include hardware or a combination of hardware and software that may receive QoS-based traffic 320 from user devices 110 and/or network 130, and may transmit QoS-based traffic 320 to user devices 110 and/or network 130. In one example, QoS traffic bucket 410 may define a bucket for VoIP QoS-based traffic. In another example, QoS traffic bucket 410 may define a bucket for video telephony QoS-based traffic. In still another example, QoS traffic bucket 410 may define a bucket for other QoS-based traffic, such as online gaming traffic, web surfing traffic, etc.

QoS traffic bucket 410 may generate QoS billing information 440 (e.g., for QoS-based traffic 320), and may provide QoS billing information 440 to user device 110. Alternatively, or additionally, QoS traffic bucket 410 may store QoS billing information 440. QoS billing information 440 may include a billing rate to be charged (e.g., to a subscriber associated with user device 110) for provision of QoS-based traffic 320. In one example, QoS billing information 440 may include a per data unit (e.g., per megabyte) billing rate to be charged for provision of QoS-based traffic 320. In another example, QoS billing information 440 may include a per time unit (e.g., per minute) billing rate to be charged for provision of QoS-based traffic 320. In one example implementation, QoS-based traffic 320 may be billed (e.g., by QoS traffic bucket 410) to a subscriber at a greater rate (e.g., a per-minute charge) than general IP traffic 310 is billed (e.g., by general IP traffic bucket 400) to the subscriber. Such an implementation may be warranted since a cost per bit of QoS-based traffic 320 may be much greater than a cost per bit of general IP traffic 310. In one example, the per-minute charge of QoS-based traffic 320 (e.g., billed by QoS traffic bucket 410) may provide a higher cost than a cost of general IP traffic 310 (e.g., billed by general IP traffic bucket 400) when a minute over the rate limit is converted to a cost per bit.

Although FIG. 4 shows example functional components of management device 120, in other implementations, management device 120 may contain fewer functional components, different functional components, differently arranged functional components, or additional functional components than depicted in FIG. 4. Alternatively, or additionally, one or more functional components of management device 120 may perform one or more other tasks described as being performed by one or more other functional components of management device 120.

Figure 5:
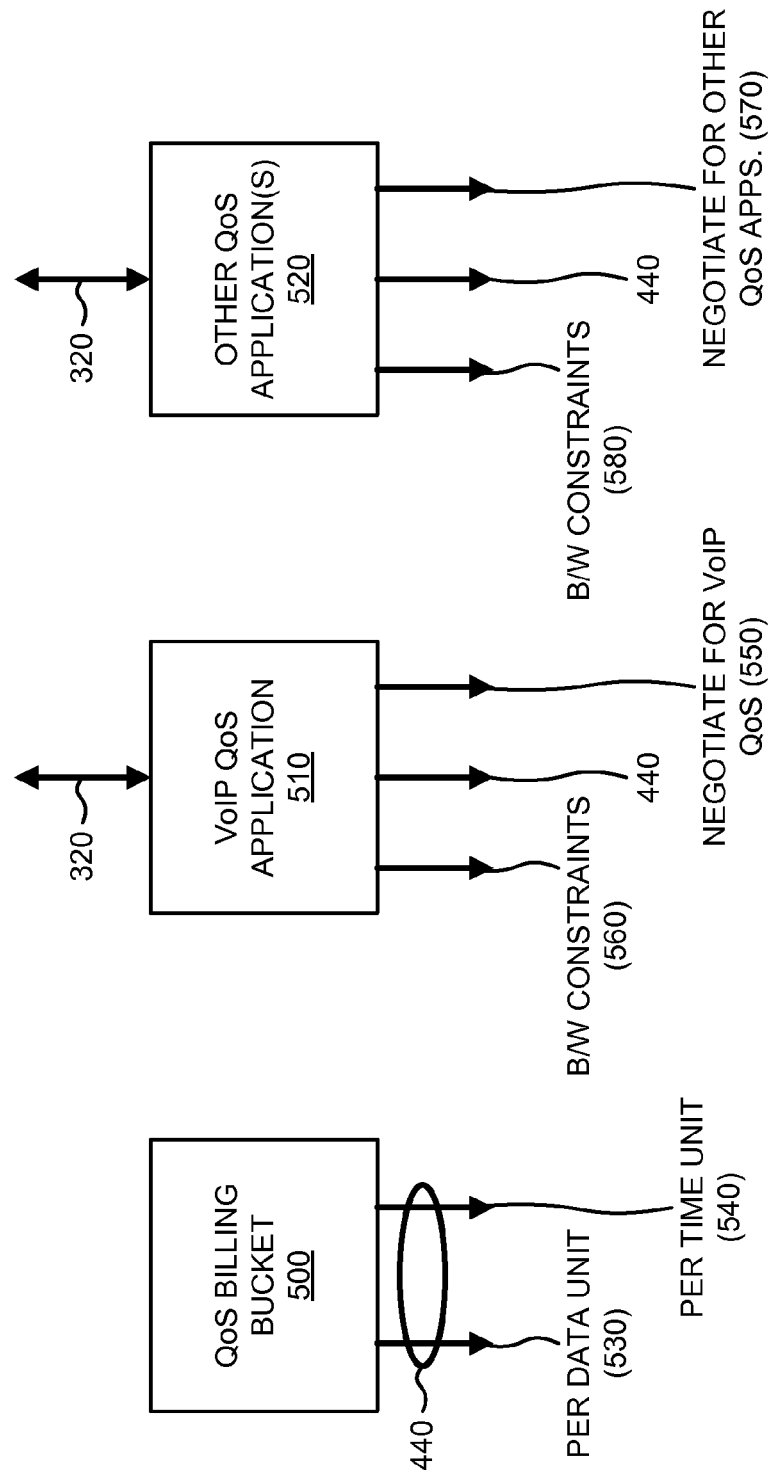
FIG. 5 is a diagram of example functional components of a QoS traffic bucket component depicted in FIG. 4.

FIG. 5 is a diagram of example functional components of QoS traffic bucket 410. In one example, the functional components described in connection with FIG. 5 may be implemented by one or more of the components depicted in FIG. 2. As shown, QoS traffic bucket 410 may include a QoS billing bucket 500, a VoIP QoS application 510, and one or more other QoS applications 520. In one example implementation, management device 120 may initially determine whether traffic provisioned between user devices 110 and network 130 is VoIP QoS-based traffic or other QoS-based traffic. Management device 120 may route the traffic determined to be VoIP QoS-based traffic to VoIP QoS application 510, and may route the traffic determined to be other QoS-based traffic to other QoS application(s) 520.

QoS billing bucket 500 may include hardware or a combination of hardware and software that may generate two separate options for billing QoS-based traffic 320. As shown in FIG. 5, QoS billing bucket 500 may generate a per data unit billing rate 530 (e.g., a first option) to be charged for provision of QoS-based traffic 320, and may generate a per time unit billing rate 540 (e.g., a second option) to be charged for provision of QoS-based traffic 320. In other implementations, QoS billing bucket 500 may utilize other charging mechanisms for billing QoS-based traffic 320, such as charging for QoS-based traffic 320 based on a time of day, bandwidth usage, application usage, etc. As further shown in FIG. 5, per data unit billing rate 530 and per time unit billing rate 540 may be part of QoS billing information 440 (FIG. 4).

VoIP QoS application 510 may include hardware or a combination of hardware and software that may receive QoS-based traffic 320 (e.g., VoIP QoS-based traffic) from user devices 110 and/or network 130, and may transmit QoS-based traffic 320 to user devices 110 and/or network 130. VoIP QoS application 510 may negotiate (e.g., with network 130) for VoIP QoS, as indicated by reference number 550, and network 130 may grant the negotiated VoIP QoS. VoIP QoS application 510 may also generate billing information 440 for VoIP QoS-based traffic. In one example, billing information 440 may include a per minute billing rate to be charged for provision of the VoIP QoS-based traffic.

As further shown in FIG. 5, VoIP QoS application 510 may subject the VoIP QoS-based traffic to bandwidth (B/W) constraints 560. Bandwidth constraints 560 may subject the VoIP QoS-based traffic to an upper rate limit that will not support higher bandwidth applications (e.g., video telephony). For example, bandwidth constraints 560 may subject the VoIP QoS-based traffic to a rate limit of one-hundred (100) kilobytes per second (kbps) and a sampling interval of forty (40) milliseconds (ms). Bandwidth constraints 560 may eliminate a need for policing the VoIP QoS-based traffic via deep packet inspection or some other obtrusive method. Bandwidth constraints 560 may also enable a network administrator (e.g., of network 130) to monetize the QoS capability of network 130 while remaining within the net neutrality rules.

Other QoS application(s) 520 may include hardware or a combination of hardware and software that may receive QoS-based traffic 320 (e.g., video telephony QoS-based traffic) from user devices 110 and/or network 130, and may transmit QoS-based traffic 320 to user devices 110 and/or network 130. Other QoS application(s) 520 may negotiate (e.g., with network 130) for higher bandwidth applications (e.g., video telephony) QoS, as indicated by reference number 570, and network 130 may grant the negotiated higher bandwidth applications QoS. Other QoS application(s) 520 may also generate billing information 440 for the higher bandwidth applications QoS-based traffic. In one example, billing information 440 may include a per minute billing rate to be charged for provision of the higher bandwidth applications QoS-based traffic. In one implementation, other QoS application(s) 520 may bill the higher bandwidth applications QoS-based traffic at a higher rate (e.g., per minute) than VoIP QoS application 510 bills for the VoIP QoS-based traffic. For example, the higher bandwidth applications QoS-based traffic may be billed at three times the rate that the VoIP QoS-based traffic is billed. In this example, if the higher bandwidth applications QoS-based traffic costs (e.g., network 130) three times as much as the cost (e.g., to network 130) of the VoIP QoS-based traffic, the higher bandwidth applications QoS-based traffic may decrement QoS traffic bucket 410 (FIG. 4) three times as fast as the VoIP QoS-based traffic.

As further shown in FIG. 5, other QoS application(s) 520 may subject the higher bandwidth applications QoS-based traffic to bandwidth constraints 580. Bandwidth constraints 580 may subject the higher bandwidth applications QoS-based traffic to an upper rate limit that is greater than the upper rate limit set by bandwidth constraints 560. For example, bandwidth constraints 580 may subject the higher bandwidth applications QoS-based traffic to a rate limit of three-hundred (300) kbps and a sampling interval of forty (40) ms. Bandwidth constraints 580 may eliminate a need for policing the higher bandwidth applications QoS-based traffic via deep packet inspection or some other obtrusive method. Bandwidth constraints 580 may also enable a network administrator (e.g., of network 130) to monetize the QoS capability of network 130 while remaining within the net neutrality rules.

Although FIG. 5 shows example functional components of QoS traffic bucket 410, in other implementations, QoS traffic bucket 410 may contain fewer functional components, different functional components, differently arranged functional components, or additional functional components than depicted in FIG. 5. Alternatively, or additionally, one or more functional components of QoS traffic bucket 410 may perform one or more other tasks described as being performed by one or more other functional components of QoS traffic bucket 410.

Figure 6:
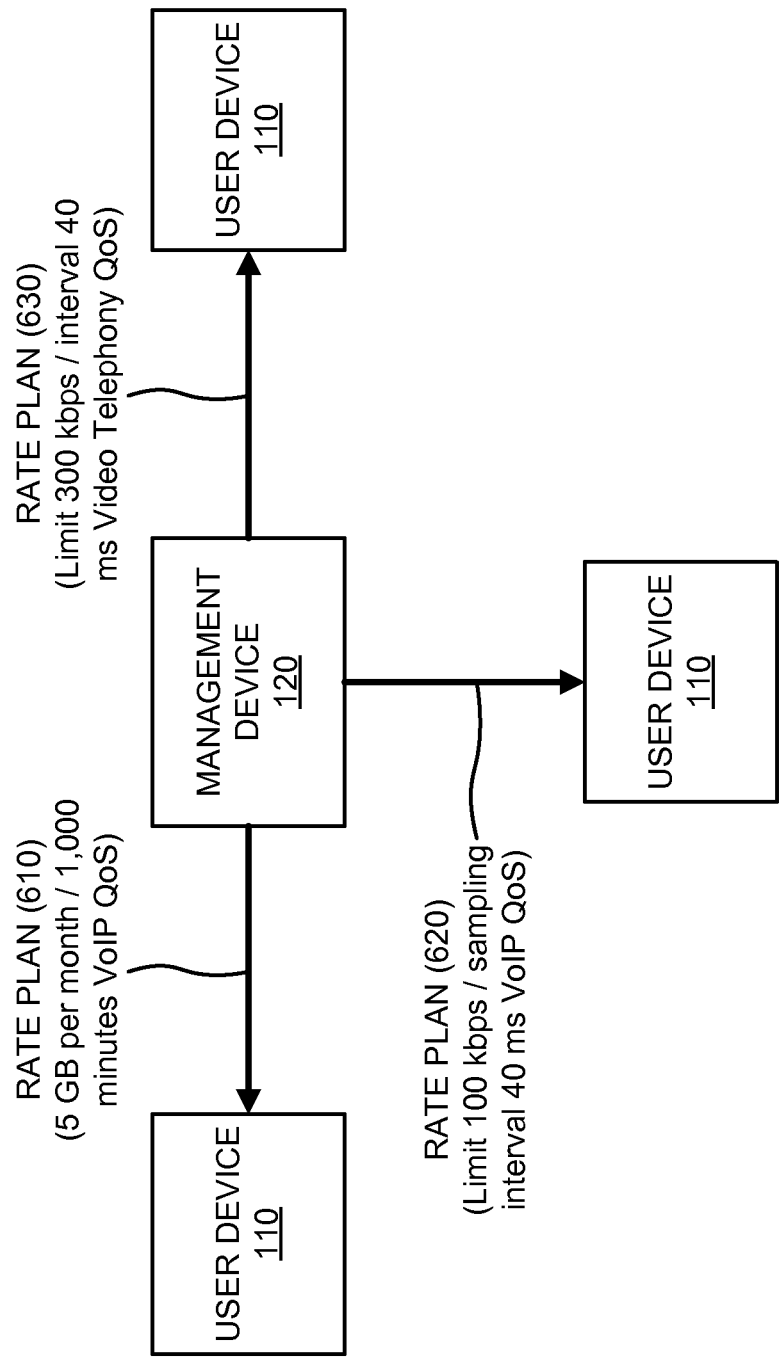
FIG. 6 is a diagram of example operations capable of being performed by another example portion of the network depicted in FIG. 1.

FIG. 6 is a diagram of example operations capable of being performed by another example portion 600 of network 100. As shown, network portion 600 may include three user devices 110 and management device 120. User devices 110 and management device 120 may include the features described above in connection with one or more of FIGS. 1-5.

As further shown in FIG. 6, management device 120 may provide different rate plans (e.g., for different services, such as VoIP services, video telephony services, etc.) to different user devices 110 (e.g., subscribers of user devices 110). For example, management device 120 may provide a first rate plan 610 to a first user device 110, a second rate plan 620 to a second user device 110, and a third rate plan 630 to a third user device 110. First rate plan 610 may, for example, enable the first user device 110 to use five (5) gigabytes of data per month and one thousand (1,000) minutes of VoIP QoS-based traffic per month. Second rate plan 620 may subject the second user device 110 to bandwidth constraints for VoIP QoS-based traffic. For example, second rate plan 620 may subject the second user device 110 to bandwidth constraints 560 that subject the VoIP QoS-based traffic to a rate limit of one-hundred (100) kilobytes per second (kbps) and a sampling interval of forty (40) ms. Third rate plan 630 may subject the third user device 110 to bandwidth constraints for video telephony QoS-based traffic. For example, third rate plan 630 may subject the third user device 110 to bandwidth constraints 580 that subject the video telephony QoS-based traffic to a rate limit of three-hundred (300) kilobytes per second (kbps) and a sampling interval of forty (40) ms. In other implementations, management device 120 may provide other rate plans or combinations of rate plans to one or more user devices 110.

Although FIG. 6 shows example components of network portion 600, in other implementations, network portion 600 may contain fewer components, different components, differently arranged components, or additional components than depicted in FIG. 6. Alternatively, or additionally, one or more components of network portion 600 may perform one or more other tasks described as being performed by one or more other components of network portion 600.

FIG. 7 is a diagram of a portion 700 of an example database capable of being provided in and/or managed by management device 120. As illustrated, database portion 700 may include a variety of information associated with subscribers, traffic types, billing information, and constraints. For example, database portion 700 may include a subscriber field 710, a traffic type field 720, a billing information field 730, a constraints field 740, and/or a variety of entries 750 associated with fields 710-740.

Subscriber field 710 may include information associated with users (e.g., of user device 110 and/or network 130), such as subscriber identifications, subscriber names, subscriber addresses, subscriber account information, etc. For example, subscriber field 710 may include entries for "Joe," "Tom," etc. In one example, each entry in subscriber field 710 may include an identifier for a subscriber (e.g., an account number, a password, etc.), the subscriber's name, subscriber contact information (e.g., address, telephone number, email address, etc.), etc.

Traffic type field 720 may include entries 750 providing traffic types associated with the subscribers provided in subscriber field 710. For example, traffic type field 720 may include entries 750 for two traffic types (e.g., "VoIP QoS" and "General IP") associated with "Joe," and for three traffic types (e.g., "Video Telephony QoS," "VoIP QoS," and "General IP") associated with "Tom." In one implementation, traffic type field 720 may provide traffic types subscribed to by the subscribers provided in subscriber field 710.

Billing information field 730 may include entries 750 providing billing information associated with the traffic types provided in traffic type field 720. For example, as shown in FIG. 7, billing information field 730 may indicate that the VoIP QoS traffic (e.g., provided in traffic type field 720) associated with Joe (e.g., provided in subscriber field 710) is to be billed on a per megabyte basis; that the general IP traffic associated with Joe is to be billed at a flat rate; that the video telephony QoS traffic associated with Tom is to be billed at "$3 per minute"; that the VoIP QoS traffic associated with Tom is to be billed at "$1 per minute"; and that the general IP traffic associated with Tom is to be billed at a flat rate.

Constraints field 740 may include entries 750 providing constraints (e.g., bandwidth constraints) associated with the traffic types provided in traffic type field 720. For example, as shown in FIG. 7, constraints field 740 may indicate that the VoIP QoS traffic (e.g., provided in traffic type field 720) associated with Joe (e.g., provided in subscriber field 710) is to be constrained to five (5) gigabytes of data per month and one thousand (1,000) minutes of VoIP QoS-based traffic per month; that the general IP traffic associated with Joe has no constraints; that the video telephony QoS traffic associated with Tom is to be constrained to a rate limit of three-hundred (300) kbps and a sampling interval of forty (40) ms; that the VoIP QoS traffic associated with Tom is to be constrained to a rate limit of one-hundred (100) kbps and a sampling interval of forty (40) ms; and that the general IP traffic associated with Tom has no constraints.

Although FIG. 7 shows example information that may be provided in database portion 700, in other implementations, database portion 700 may contain less information, different information, differently arranged information, and/or additional information than depicted in FIG. 7.

Figure 8:
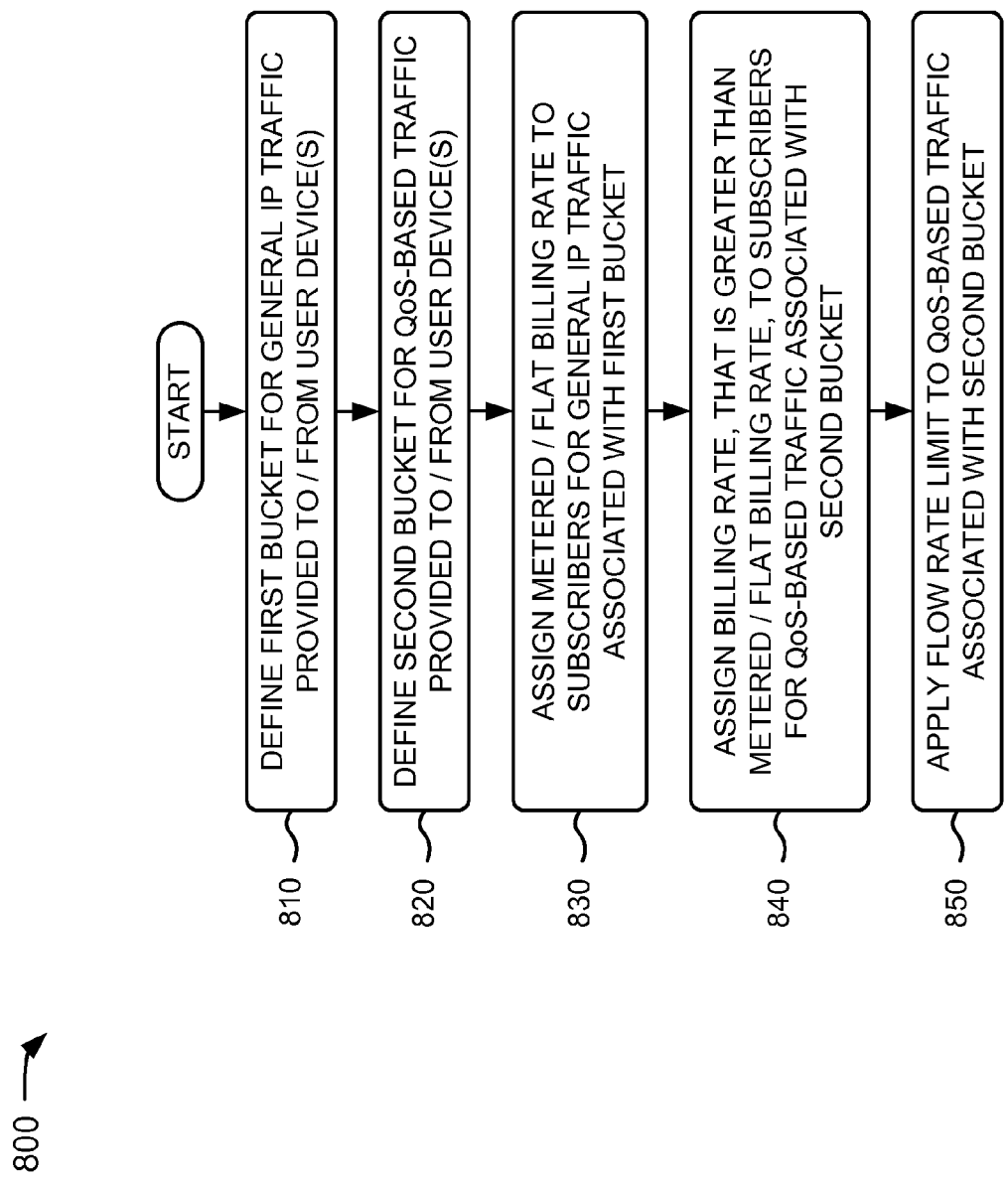
FIGS. 8-10 are flow charts of an example process for providing QoS-enabled VoIP and video telephony applications in open networks according to implementations described herein.
Figure 9:
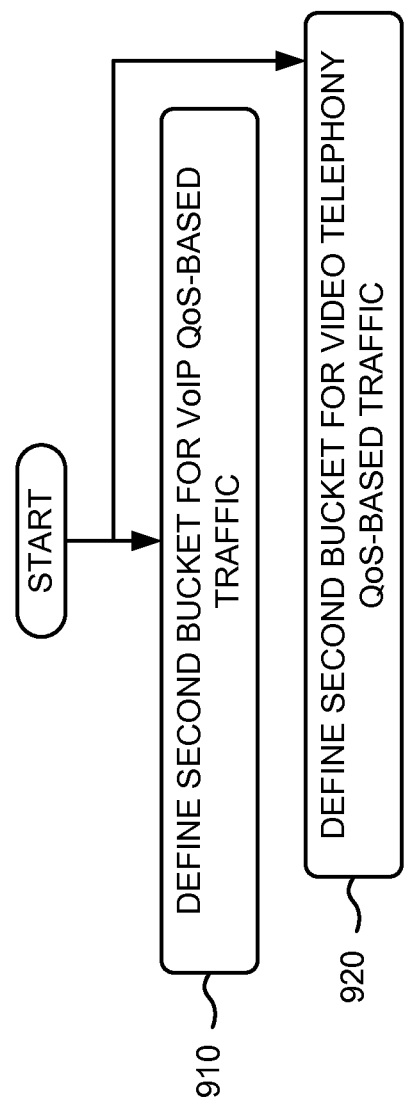
Figure 10:
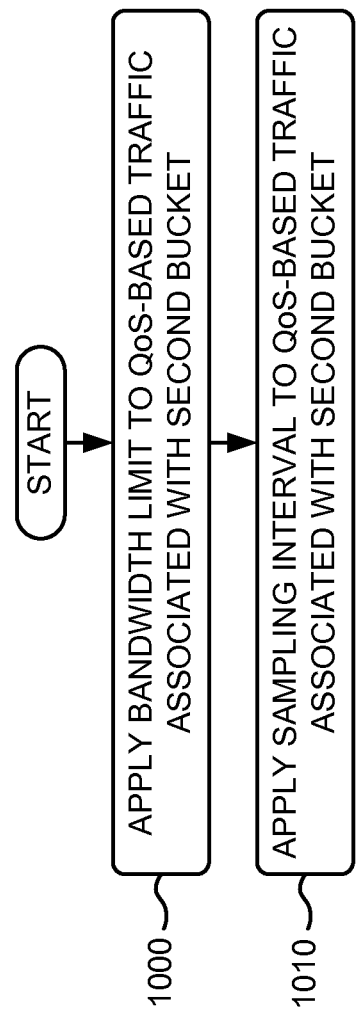

FIGS. 8-10 are flow charts of an example process 800 for providing QoS-enabled VoIP and video telephony applications in open networks according to implementations described herein. In one implementation, process 800 may be performed by management server 120. In another implementation, some or all of process 800 may be performed by another device or group of devices, including or excluding management server 120.

As illustrated in FIG. 8, process 800 may include defining a first bucket for general IP traffic provided to/from one or more user devices (block 810), and defining a second bucket for QoS-based traffic provided to/from the user device(s) (block 820). For example, in implementations described above in connection with FIG. 3, a subscriber (e.g., associated with user device 110) may transmit and/or receive (e.g., via user device 110) general IP traffic 310 to and/or from network 130 (e.g., via management device 120). The subscriber (e.g., associated with user device 110) may transmit and/or receive (e.g., via user device 110) QoS traffic 320 to and/or from network 130 (e.g., via management device 120). Management device 120 may define a first bucket for general IP traffic 310 provided to/from user device 110, and may define a second bucket for QoS-based traffic 320 provided to/from user device 110.

As further shown in FIG. 8, process 800 may include assigning a metered or flat billing rate to subscribers for the general IP traffic associated with the first bucket (block 830), and assigning a billing rate, that is greater than the metered/flat billing rate, to subscribers for the QoS-based traffic associated with the second bucket (block 840). For example, in implementations described above in connection with FIG. 3, management device 120 may assign a metered or flat billing rate to the subscriber for general IP traffic 310 associated with the first bucket, and may assign a billing rate, which is greater than the metered/flat billing rate, to the subscriber for QoS-based traffic 320 associated with the second bucket.

Returning to FIG. 8, process 800 may include applying a flow rate limit to the QoS-based traffic associated with the second bucket (block 850). For example, in implementations described above in connection with FIGS. 3 and 5, management device 120 may apply a flow rate limit to QoS-based traffic 320 associated with the second bucket. In one example, VoIP QoS application 510 of management device 120 may subject the VoIP QoS-based traffic to bandwidth constraints 560. Bandwidth constraints 560 may subject the VoIP QoS-based traffic to an upper rate limit that will not support higher bandwidth applications (e.g., video telephony). For example, bandwidth constraints 560 may subject the VoIP QoS-based traffic to a rate limit of one-hundred (100) kbps and a sampling interval of forty (40) ms. Bandwidth constraints 560 may eliminate a need for policing the VoIP QoS-based traffic via deep packet inspection or some other obtrusive method. Bandwidth constraints 560 may also enable a network administrator (e.g., of network 130) to monetize the QoS capability of network 130 while remaining within the net neutrality rules.

Process block 820 may include the process blocks depicted in FIG. 9. As shown in FIG. 9, process block 820 may include defining the second bucket for VoIP QoS-based traffic (block 910) or defining the second bucket for video telephony QoS-based traffic (block 920). For example, in implementations described above in connection with FIG. 4, QoS traffic bucket 410 of management device 120 may receive QoS-based traffic 320 from user devices 110 and/or network 130, and may transmit QoS-based traffic 320 to user devices 110 and/or network 130. In one example, QoS traffic bucket 410 may define a bucket for VoIP QoS-based traffic. In another example, QoS traffic bucket 410 may define a bucket for video telephony QoS-based traffic. In still another example, QoS traffic bucket 410 may define a bucket for other QoS-based traffic, such as online gaming traffic, web surfing traffic, etc.

Process block 850 may include the process blocks depicted in FIG. 10. As shown in FIG. 10, process block 850 may include applying a bandwidth limit to the QoS-based traffic associated with the second bucket (block 1000), and applying a sampling interval to the QoS-based traffic associated with the second bucket (block 1010). For example, in implementations described above in connection with FIG. 5, other QoS application(s) 520 of management device 120 may subject the higher bandwidth applications QoS-based traffic to bandwidth constraints 580. In one example, bandwidth constraints 580 may subject the higher bandwidth applications QoS-based traffic to a rate limit of three-hundred (300) kbps and a sampling interval of forty (40) ms. Bandwidth constraints 580 may eliminate a need for policing the higher bandwidth applications QoS-based traffic via deep packet inspection or some other obtrusive method. Bandwidth constraints 580 may also enable a network administrator (e.g., of network 130) to monetize the QoS capability of network 130 while remaining within the net neutrality rules.

Systems and/or methods described herein may provide QoS-enabled VoIP and video telephony applications in open networks, without a need for QoS policing. In one implementation, for example, the systems and/or methods may define a first bucket (or identifier) for general IP traffic (e.g., associated with an open network) provided to/from one or more user devices, and may define a second bucket (or identifier) for QoS-based traffic (e.g., associated with the open network) provided to/from the one or more user devices. The systems and/or methods may assign a metered or flat billing rate to subscribers for the general IP traffic associated with the first bucket, and may assign a billing rate, which is greater than the metered/flat billing rate, to subscribers for the QoS-based traffic associated with the second bucket. The systems and/or methods may apply a flow rate limit to the QoS-based traffic associated with the second bucket.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the description of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    defining, by the computing device, a first bucket for general Internet protocol (IP) traffic provided to and from user devices associated with an open network;
    defining, by the computing device, a second bucket for quality of service (QoS)-based traffic provided to and from the user devices, wherein defining a second bucket includes:
        generating, by a billing bucket, first billing information including a per data unit billing rate and a per time unit billing rate, to be charged for provisioning of QoS for the QoS-based traffic,
        routing voice-over-Internet Protocol (VoIP) traffic to a first application configured to negotiate with the open network for provisioning of QoS for the VoIP traffic and to generate second billing information associated with the provisioning of QoS for the VoIP traffic,
        routing video telephony traffic to a second application configured to negotiate with the open network for provisioning of QoS for the video telephony traffic and to generate third billing information associated with the provisioning of QoS for the video telephony traffic,
        routing QoS-based traffic, other than the VoIP traffic and the video telephony traffic, to a third application configured to negotiate with the open network for provisioning of QoS for the QoS-based traffic other than the VoIP traffic and the video telephony traffic and to generate fourth billing information associated with the provisioning of QoS for the QoS-based traffic other than the VoIP traffic and the video telephony traffic,
        applying, by the first application, a first flow rate limit to the VoIP traffic, wherein applying the first flow rate limit includes applying a first sampling interval, of a predetermined first length defined in a rate plan, to the VoIP traffic,
        applying, by the second application, a second, different flow rate limit to the video telephony traffic, wherein applying the second flow rate limit includes applying a second sampling interval, of a predetermined second length defined in the rate plan, to the video telephony traffic, and
        applying different bandwidth limits, corresponding to the first and second flow rate limits, to the QoS-based traffic associated with the second bucket;
    assigning, by the computing device, a first billing rate for the general IP traffic associated with the first bucket;
    assigning, by the computing device and based on the first billing information, different types of second billing rates to the QoS-based traffic associated with the second bucket, wherein the second billing rates are greater than the first billing rate and include the per data unit billing rate associated with a first subscriber and the per time unit billing rate associated with a second subscriber; and
    associating, by the computing device, the first billing rate and the different types of second billing rates with multiple subscribers associated with the user devices.

2. The computing device-implemented method of claim 1, where the general IP traffic comprises one or more of:
    best effort traffic, non-detrimental traffic, or traffic that is not sensitive to QoS metrics.

3. The computing device-implemented method of claim 1, wherein the QoS-based traffic, other than the VOIP traffic and the video telephony traffic, comprises one or more of:
    online gaming traffic, or
    web browsing traffic.

4. The computing device-implemented method of claim 1, wherein the second flow rate limit is greater than the first flow rate limit.

5. The computing device-implemented method of claim 1, where the first billing rate comprises one or more of:
    a metered billing rate,
    a flat billing rate, or
    an unlimited billing rate.

6. The computing device-implemented method of claim 1, wherein the per data unit billing rate associated with the first subscriber and the per time unit billing rate associated with the second subscriber are for the provisioning of QoS for the VoIP traffic.

7. The computing device-implemented method of claim 1, where the computing device comprises one or more of:
    a gateway,
    a router, a switch,
a firewall,
a network interface card (NIC),
a hub,
a bridge,
a proxy server, or
an optical add-drop multiplexer (OADM).

8. A device associated with an open network, the device comprising:
a memory to store a plurality of instructions; and
a processor to execute instructions in the memory to:
associate a first bucket with general Internet protocol (IP) traffic provided to and from user devices and the open network,
associate a second bucket with quality of service (QoS)-based traffic provided to and from the user devices and the open network, wherein, with respect to the second bucket, the processor executes instructions in the memory to:
generate, via a billing bucket, first billing information including a per data unit billing rate and a per time unit billing rate, to be charged for provisioning of QoS for the QoS-based traffic,
perform a first negotiation with the open network for provisioning of QoS associated with voice-over-Internet Protocol (VoIP) traffic and to generate second billing information associated with the provisioning of QoS for the VoIP traffic,
perform a second negotiation with the open network for provisioning of QoS associated with video telephony traffic and to generate third billing information associated with the provisioning of QoS for the video telephony traffic, and
perform a third negotiation with the open network for provisioning of QoS associated with QoS-based traffic other than the VoIP traffic and the video telephony traffic and to generate fourth billing information associated with the provisioning of QoS for the QoS-based traffic other than the VoIP traffic and the video telephony traffic,
apply a first flow rate limit to the VoIP traffic, wherein to apply the first flow rate limit the processor executes the instructions to apply a first sampling interval, of a predetermined first length defined in a rate plan, to the VoIP traffic,
apply a second, different flow rate limit to the video telephony traffic, wherein to apply the second flow rate limit the processor executes the instructions to apply a second sampling interval, of a predetermined second length defined in the rate plan, to the video telephony traffic, and
apply different bandwidth limits, corresponding to the first and second flow rate limits, to the QoS-based traffic associated with the second bucket,
assign a first billing rate for the general IP traffic associated with the first bucket,
assign, based on the first billing information, a plurality of different second billing rates to the QoS-based traffic associated with the second bucket, wherein the second billing rates are greater than the first billing rate and include the per data unit billing rate associated with a first subscriber and the per time unit billing rate associated with a second subscriber,
associate the first billing rate and different ones of the different second billing rates with multiple subscribers associated with the user devices, and
store the first billing rate, the plurality of different second billing rates, and information identifying the associated subscribers in a database provided in the memory.

9. The device of claim 8, where the device comprises an edge router of the open network.

10. The device of claim 8, where the general IP traffic comprises one or more of:
best effort traffic,
non-detrimental traffic, or
traffic that is not sensitive to QoS metrics.

11. The device of claim 8, wherein the QoS-based traffic, other than the VOIP traffic and the video telephony traffic, comprises one or more of:
online gaming traffic, or
web browsing traffic.

12. The device of claim 8, wherein the processor is further to execute instructions in the memory to:
apply a flow rate limit of one-hundred (100) kilobytes per second (kbps) to the VoIP traffic, and
apply a flow rate limit of three-hundred (300) kilobytes per second (kbps) to the video telephony traffic.

13. The device of claim 8, where the first billing rate comprises one or more of:
a metered billing rate,
a flat billing rate, or
an unlimited billing rate.

14. The device of claim 8, wherein the per time billing rate includes a per minute billing rate.

15. The device of claim 8, wherein the processor is further to execute instructions in the memory to:
receive, from the open network and based on the first negotiation, the QoS associated with the VoIP traffic,
receive, from the open network and based on the second negotiation, the QoS associated with the video telephony traffic, and
receive, from the open network and based on the third negotiation, the QoS associated with the QoS-based traffic other than the VoIP traffic and the video telephony traffic.

16. The device of claim 8, wherein the per data unit billing rate associated with the first subscriber and the per time unit billing rate associated with the second subscriber are for the provisioning of QoS for the VoIP traffic.

17. A device, comprising:
one or more processors configured to:
define a first bucket for general Internet protocol (IP) traffic provided to and from a user device associated with an open network;
define a second bucket for quality of service (QoS)-based traffic provided to and from the user device, including:
generate, via a billing bucket, first billing information including a per data unit billing rate and a per time unit billing rate, to be charged for provisioning of QoS for the QoS-based traffic,
negotiate with the open network for provisioning of QoS associated with Voice-over-Internet Protocol (VoIP) traffic and to generate second billing information associated with the provisioning of QoS for the VoIP traffic,
negotiate with the open network for provisioning of QoS associated with video telephony traffic and to generate third billing information associated with the provisioning of QoS for the video telephony traffic, negotiate with the open network for provisioning of QoS associated with QoS-based traffic other than the VoIP traffic and the video telephony traffic and to generate fourth billing information associated with the provisioning of QoS for the QoS-based traffic other than the VoIP traffic and the video telephony traffic, apply a first flow rate limit to the VoIP traffic, wherein to apply the first flow rate limit the one or more processors apply a first sampling interval, of a predetermined first length defined in a rate plan, to the VoIP traffic, apply a second, different flow rate limit to the video telephony traffic, wherein to apply the second flow rate limit the one or more processors apply a second sampling interval, of a predetermined second length defined in the rate plan, to the video telephony traffic, and apply different bandwidth limits, corresponding to the first and second flow rate limits, to the QoS-based traffic associated with the second bucket;

assign a first billing rate for the general IP traffic associated with the first bucket;

assign, based on the first billing information, multiple second billing rates to the QoS-based traffic associated with the second bucket, where the second billing rates are greater than the first billing rate and include the per data unit billing rate associated with the provisioning of QoS for the VoIP traffic and the per time unit billing rate associated with the QoS for the video telephony traffic;

associate the first billing rate and the second billing rates with a subscriber associated with the user device; and store the first billing rate, the second billing rates, and information identifying the associated subscriber in a database.

18. The device of claim 17, wherein the per data unit billing rate associated with the subscriber and the per time unit billing rate associated with the subscriber are for the provisioning of QoS for the VoIP traffic.

* * * * *